(12) United States Patent
Bousset

(10) Patent No.: US 7,017,225 B2
(45) Date of Patent: Mar. 28, 2006

(54) WINDSCREEN WIPER DEVICE COMPRISING A SEPARATION-LIMITING DEVICE

(75) Inventor: Xavier Bousset, Clermont-Ferrand (FR)

(73) Assignee: Valeo Systemes d'Essuyage, (FR)

( * ) Notice: Subject to any disclaimer, the term of this patent is extended or adjusted under 35 U.S.C. 154(b) by 0 days.

(21) Appl. No.: 10/518,132

(22) PCT Filed: Jun. 23, 2003

(86) PCT No.: PCT/EP03/06599

§ 371 (c)(1),
(2), (4) Date: Dec. 15, 2004

(87) PCT Pub. No.: WO2004/002790

PCT Pub. Date: Jan. 8, 2004

(65) Prior Publication Data

US 2005/0217055 A1  Oct. 6, 2005

(30) Foreign Application Priority Data

Jun. 28, 2002 (FR) .................... 02 08216

(51) Int. Cl.
*B60S 1/34* (2006.01)
(52) U.S. Cl. .............. 15/250.34; 15/250.351
(58) Field of Classification Search ............ 15/250.34, 15/250.351, 250.352, 250.202, 250.19
See application file for complete search history.

(56) References Cited

U.S. PATENT DOCUMENTS

| | | | | | |
|---|---|---|---|---|---|
| 2,260,903 A | * | 10/1941 | Horton | .................. | 15/250.351 |
| 2,623,232 A | * | 12/1952 | Krohm | .................... | 15/250.34 |
| 2,799,039 A | * | 7/1957 | Oishei | ................... | 15/250.202 |
| 2,838,782 A | * | 6/1958 | Wallis | .................... | 15/250.352 |

FOREIGN PATENT DOCUMENTS

| | | |
|---|---|---|
| DE | 31 49 034 A1 | 6/1983 |
| EP | 0755833 A1 | 1/1997 |
| FR | 2771061 A1 | 5/1999 |
| GB | 2205033 | * 11/1988 |

* cited by examiner

Primary Examiner—Gary K. Graham
(74) Attorney, Agent, or Firm—Osha Liang LLP

(57) ABSTRACT

The invention relates to a windscreen wiper device comprising an arm (1) mounted in such a way that it can pivot about a first axis (3) on a driver (2) which is rotationally actuated within an angular range by means of the shaft (5) of an axis which is substantially parallel to the first axis (3), comprising means for limiting the extent of pivoting in a direction opposite to a surface that is to be wiped, consisting of an arm part and a driver part which acts as a stop when the arm (1) is pivoted from a specific angle. According to the invention, said driver part is a washer (6) which is mounted on said shaft (5) and is integral with the driver (2) and is provided with a stop means for said arm part.

21 Claims, 3 Drawing Sheets

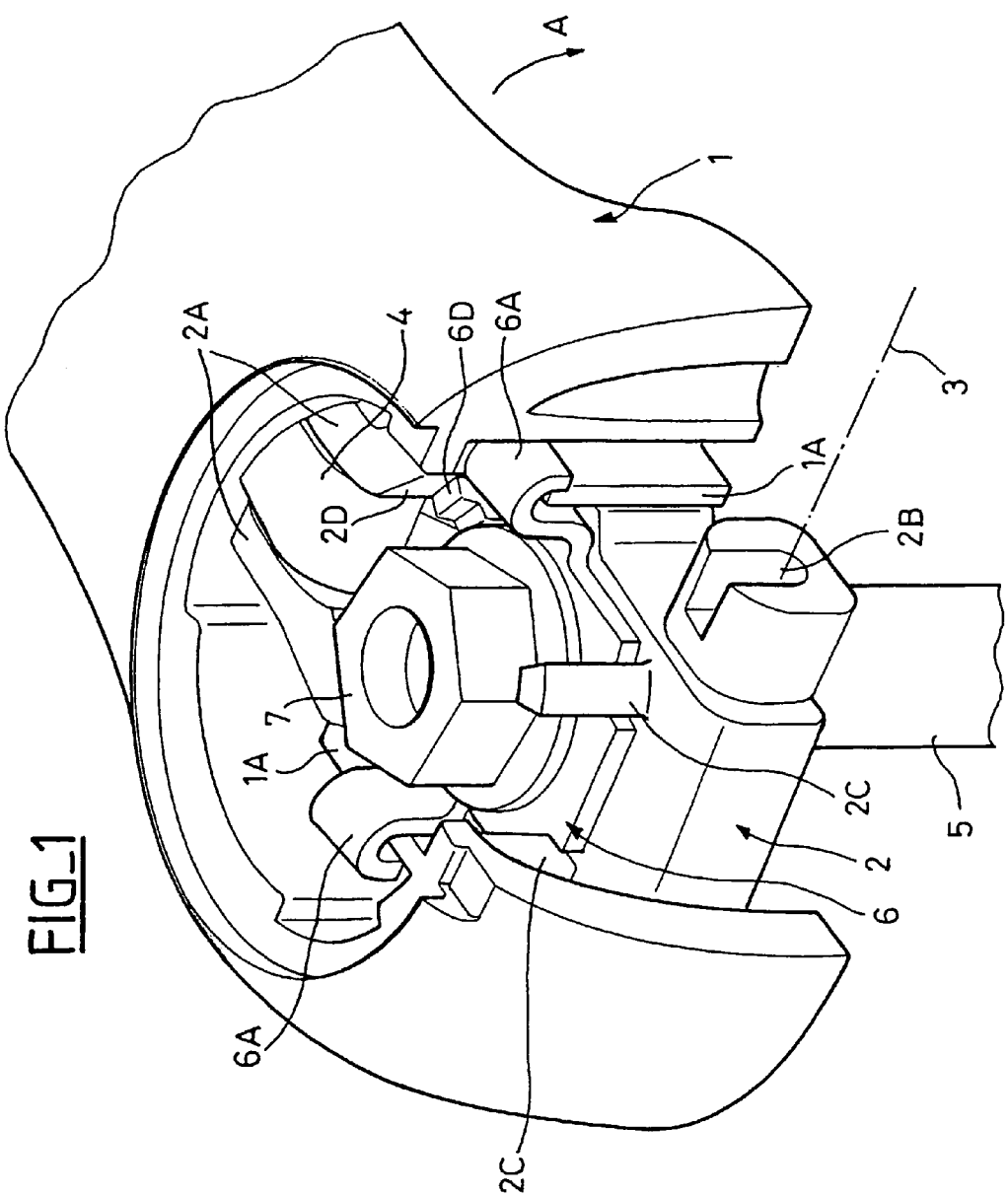
FIG_1

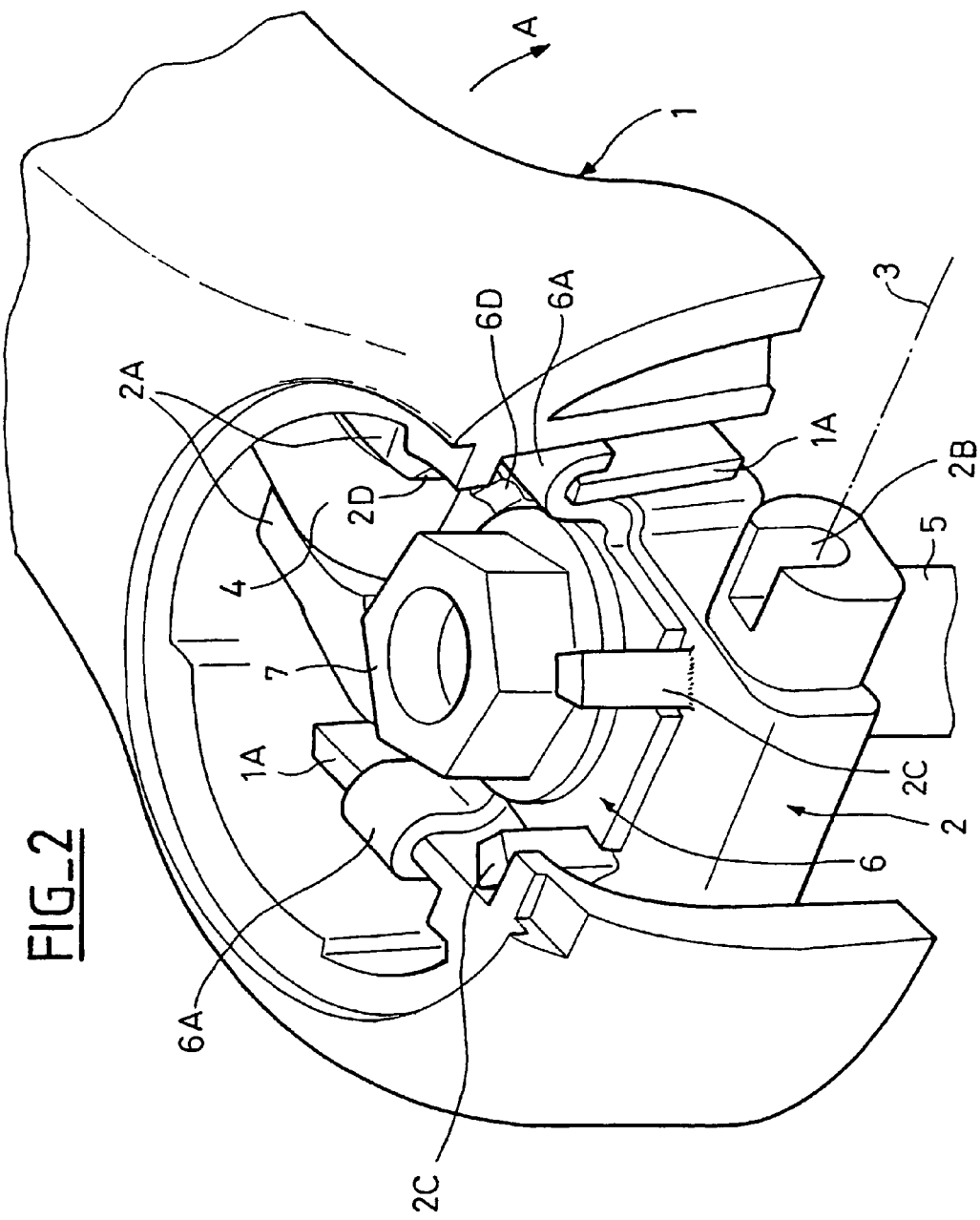
FIG_2

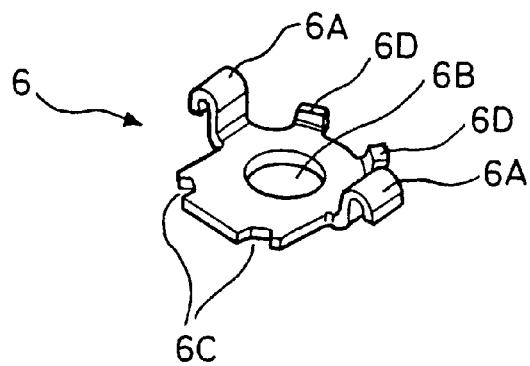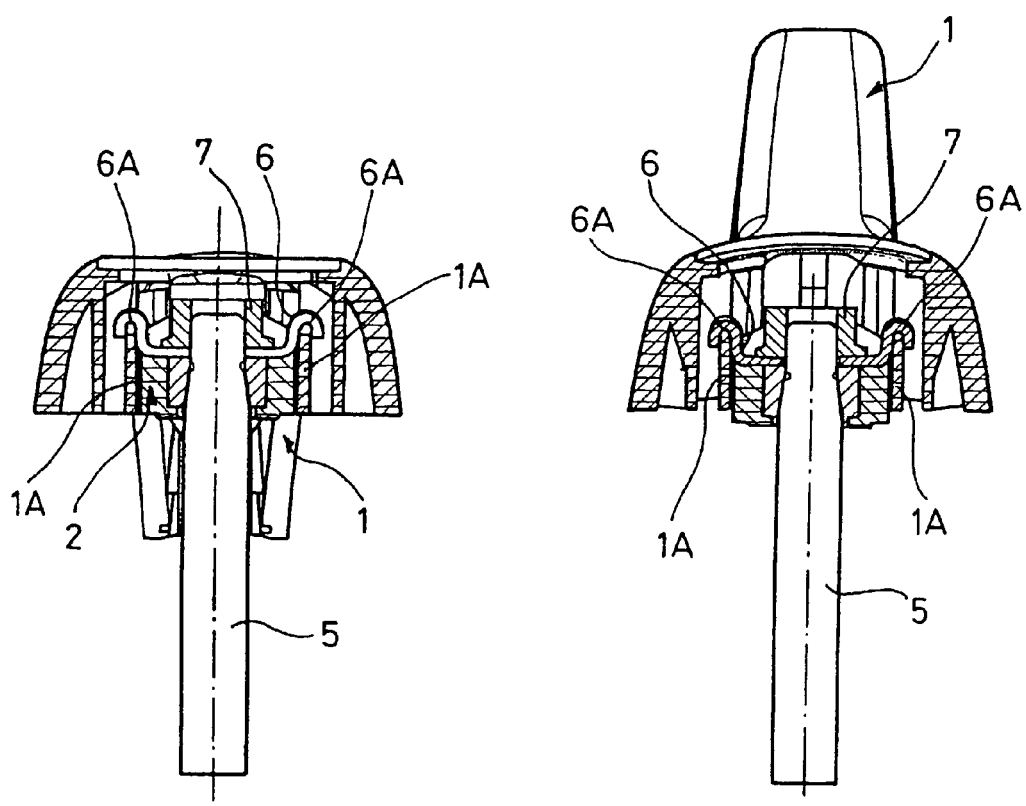

WINDSCREEN WIPER DEVICE COMPRISING A SEPARATION-LIMITING DEVICE

BACKGROUND OF THE INVENTION

The present invention relates to a wiper device comprising an arrangement for limiting lift-off.

It concerns more precisely a motor car wiper device, in particular intended for the rear window of a motor car.

The arm and associated blade of wiper devices may be lifted by air currents, at high speed, or by the brushes when the motor car is being washed in automatic machines. Detachment of the arm and loss thereof may result therefrom, which is particularly prejudicial to the driving safety of the motor car. It therefore proves necessary to equip the wiper devices with a lift-off limitation arrangement.

Such a wiper device is described in the patent document GB 2 205 033.

SUMMARY OF THE INVENTION

The wiper device described in this document comprises an articulated arm pivoting about a first axis on a driver rotationally actuated over an angular range by means of a shaft substantially perpendicular to the first axis.

It comprises means of limiting the pivoting in the opposite direction to the surface to be wiped, consisting of a shoulder formed on the arm and a shoulder formed on the driver coming into abutment when the arm is pivoted by a given angle.

The shoulders are formed on the arm and on the driver. As a result this type of limitation arrangement is integrated in the design of the wiper device.

The invention proposes a lift-off limitation arrangement which can be adapted to existing wiper devices and which presents great ease of mounting.

To do this, it relates to a wiper device comprising an arm articulated for pivoting about a first axis on a driver rotationally actuated over an angular range by means of a shaft with its axis substantially perpendicular to the first axis, comprising means of limiting said pivoting in the opposite direction to a surface to be wiped, consisting of an arm part and a driver part coming into abutment when the arm is pivoted by a given angle, characterised in that the driver part is a washer mounted on the shaft, fixed to the driver and provided with an abutment means for said arm part.

According to a preferred embodiment, the stop means consist of at least one projecting branch on the periphery of the washer and the arm part consists of a tongue fixed to the arm.

Advantageously, the projecting branch consists of a U-shaped profile whose opening is directed towards the surface and receives the tongue when the arm is pivoted by a given angle.

The washer is preferably interposed between the driver and a nut fixing the latter to the shaft.

The first axis is preferably disposed in the driver on the side opposite to the arm with respect to said shaft.

The driver can comprise positive location means for correct positioning of the washer.

And preferably the washer is metallic.

BRIEF DESCRIPTION OF THE DRAWINGS

The invention is described below in more detail by means of figures depicting only a preferred embodiment of the invention.

FIG. 1 a partial perspective view of a wiper device according to the invention in the normal position.

FIG. 2 a partial perspective view of a wiper device according to the invention in the lifted position.

FIG. 3 is a perspective view of a washer according to the invention.

FIG. 4 is a view in transverse section of a wiper device according to the invention in the normal position.

FIG. 5 is a view in transverse section of a wiper device according to the invention in the lifted position.

DESCRIPTION OF THE DRAWINGS

FIGS. 1 and 2 are partial views of a wiper device depicting the area of articulation of the arm 1 on the driver 2, part of the arm not being depicted for better visibility. The arm 1 and driver 2 are preferably made from plastics material. The driver 2 is actuated in rotation over an angular range by means of a shaft 5. This rotation provides the sweep of the arm and its blade on the window. The arm 1 is articulated for pivoting about a first axis 3 substantially perpendicular to the axis of the shaft 5, by virtue of two tenons, not visible, embedded in two supports 2B of the driver 2. The first axis 3 is disposed in the driver on the side opposite to the arm with respect to the shaft 5.

This possibility of pivoting makes it possible to apply the arm 1 and its associated blade against the window in a pivoting in the direction of the arrow A under the action of a spring housed in the arm, articulated on the latter and articulated at its other end 4 on two branches 2A of the driver. This possibility of pivoting also allows the lifting of the arm and its blade from the window by pivoting in the opposite direction to the arrow A counter to the force of the spring. It is this lifting which the invention proposes to limit in order to prevent any prejudicial detachment.

The means of limiting this pivoting in the opposite direction to the window, known as lifting, consist of an arm part and a driver part coming into abutment when the arm is pivoted by a given angle.

Said driver part is a washer 6 mounted on the shaft 5 and fixed to the driver by interposing between the driver 2 and a fixing nut 7 screwed to the end of the shaft 5.

It is provided with an abutment means for the said arm part consisting of two projecting branches 6A on the periphery of the washer 6.

The washer 6 is shown alone in perspective in FIG. 3. It is preferably metallic and comprises a central bore 6B intended to receive the end of the shaft 5. The washer 6 also comprises two notches 6C and two rims 6D intended to cooperate with positive location means carried by the driver 2 for correct positioning of the washer. These positive location means consist, as can be seen in FIGS. 1 and 2, of two tenons 2C and a wall 2D of the driver against which the notches 6C and rims 6D of the washer 6 are slid when the washer 6 is mounted.

As can be seen in particular in FIGS. 4 and 5, the projecting branches 6A each consist of a U-shaped profile whose opening is directed towards the window to be wiped and the arm 1 comprises two tongues 1A moulded with it and disposed on each side of the driver 2 and received in the branches 6A once the arm is mounted. As can be seen in FIG. 5, in the maximum allowed lift-off position, these blades 1A come into abutment at the bottom of the U-shaped opening of these branches 6A of the washer 6.

By design of the washer 6 and the dimensions of its projecting branches 6A, the maximum lift-off angle can be chosen and adjusted.

What is claimed is:

1. A wiper device comprising an arm articulated for pivoting about a first axis on a driver actuated for rotation over an angular range by means of a shaft with its axis substantially perpendicular to the first axis, comprising means of limiting said pivoting in the opposite direction to a surface to be wiped, consisting of an arm part and a driver part coming into abutment when the arm is pivoted by a given angle, characterised in that said driver part is a washer mounted on said shaft, fixed to the driver and provided with an abutment means for said arm part.

2. A wiper device according to claim 1, characterised in that said abutment means consists of at least one projecting branch on the periphery of said washer and said arm part consists of a tongue fixed to the arm.

3. A wiper device according to claim 2, characterised in that said projecting branch consists of a U-shaped profile whose opening is directed towards said surface and receives said tongue when the arm is pivoted by a given angle.

4. A wiper device according to claim 3, characterised in that said washer is interposed between the driver and a nut for fixing the latter to said shaft.

5. A wiper device according to claim 3, characterised in that said first axis is disposed in the driver on the opposite side to the arm with respect to said shaft.

6. A wiper device according to claim 3, characterised in that the driver comprises positive location means for correct positioning of said washer.

7. A wiper device according to claim 3, characterised in that said washer is metallic.

8. A wiper device according to claim 2, characterised in that said washer is interposed between the driver and a nut for fixing the latter to said shaft.

9. A wiper device according to claim 2, characterised in that said first axis is disposed in the driver on the opposite side to the arm with respect to said shaft.

10. A wiper device according to claim 2, characterised in that the driver comprises positive location means for correct positioning of said washer.

11. A wiper device according to claim 2, characterised in that said washer is metallic.

12. A wiper device according to claim 1, characterised in that said washer is interposed between the driver and a nut for fixing the latter to said shaft.

13. A wiper device according to claim 12, characterised in that said first axis is disposed in the driver on the opposite side to the arm with respect to said shaft.

14. A wiper device according to claim 12, characterised in that the driver comprises positive location means for correct positioning of said washer.

15. A wiper device according to claim 12, characterised in that said washer is metallic.

16. A wiper device according to claim 1, characterised in that said first axis is disposed in the driver on the opposite side to the arm with respect to said shaft.

17. A wiper device according to claim 16, characterised in that the driver comprises positive location means for correct positioning of said washer.

18. A wiper device according to claim 16, characterised in that said washer is metallic.

19. A wiper device according to claim 1, characterised in that the driver comprises positive location means for correct positioning of said washer.

20. A wiper device according to claim 19, characterised in that said washer is metallic.

21. A wiper device according to claim 1, characterised in that said washer is metallic.

* * * * *